(12) United States Patent
Peng et al.

(10) Patent No.: US 9,233,300 B2
(45) Date of Patent: Jan. 12, 2016

(54) SYSTEM TO DELIVER PRIORITIZED GAME AUDIO WIRELESSLY WITH A MINIMAL LATENCY

(71) Applicant: ISSC TECHNOLOGIES CORP., Hsinchu (TW)

(72) Inventors: Kelvin Chi-Hsuang Peng, Rancho Palos Verdes, CA (US); Sheng Liu, Irvine, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 140 days.

(21) Appl. No.: 13/948,815

(22) Filed: Jul. 23, 2013

(65) Prior Publication Data

US 2014/0031122 A1    Jan. 30, 2014

Related U.S. Application Data

(60) Provisional application No. 61/675,080, filed on Jul. 24, 2012.

(51) Int. Cl.
*A63F 13/00* (2014.01)
*A63F 13/54* (2014.01)

(52) U.S. Cl.
CPC ............. *A63F 13/00* (2013.01); *A63F 13/54* (2014.09); *A63F 2300/6063* (2013.01)

(58) Field of Classification Search
CPC ............ A63F 13/02; A63F 2300/6063; A63F 2300/6081; G07F 17/32; G07F 17/3202; G07F 17/3225; G07F 17/326; G06F 3/16; G11B 2020/10546; G11B 2020/10759
See application file for complete search history.

(56) References Cited

U.S. PATENT DOCUMENTS

| | | | | |
|---|---|---|---|---|
| 8,463,181 | B2 | 6/2013 | Hsu et al. | 455/41.2 |
| 2003/0190049 | A1* | 10/2003 | Kim | 381/370 |
| 2004/0254993 | A1* | 12/2004 | Mamas | 709/206 |
| 2005/0124414 | A1* | 6/2005 | Hussaini et al. | 463/35 |
| 2007/0015485 | A1 | 1/2007 | Debiasio et al. | 455/345 |
| 2007/0177628 | A1* | 8/2007 | Choi et al. | 370/469 |
| 2009/0286600 | A1* | 11/2009 | Hideya | 463/35 |
| 2010/0113159 | A1* | 5/2010 | Chapman et al. | 463/42 |
| 2010/0317437 | A1* | 12/2010 | Berry et al. | 463/35 |
| 2012/0052948 | A1* | 3/2012 | Soelberg et al. | 463/35 |

FOREIGN PATENT DOCUMENTS

| | | | | |
|---|---|---|---|---|
| CN | 201328181 Y | 10/2009 | | H04R 5/033 |
| TW | 201008140 A | 2/2010 | | H04B 1/00 |

OTHER PUBLICATIONS

TSMC, 28nm Technology, http://www.tsmc.com/english/dedicatedFoundry/technology/28nm.htm, Feb. 21, 2012.*
Memoryexpress, Logitech Wireless Gaming Headset G930, http://www.memoryexpress.com/Products/MX31139, May 22, 2012.*

* cited by examiner

*Primary Examiner* — Jason Yen
(74) *Attorney, Agent, or Firm* — Slayden Grubert Beard PLLC

(57) ABSTRACT

The disclosure relates to a system to deliver prioritized game audio wirelessly with a minimal latency by processing a low-priority game audio (such as background music) and high-priority game audio (such as sound effects) in a wireless gaming system, resulting in a minimal high-priority audio latency. The disclosure can then be used to transmit high quality positional multichannel audio at a minimal wireless bandwidth.

18 Claims, 1 Drawing Sheet

US 9,233,300 B2

SYSTEM TO DELIVER PRIORITIZED GAME AUDIO WIRELESSLY WITH A MINIMAL LATENCY

CROSS REFERENCE TO RELATED APPLICATIONS

This nonprovisional application claims priority under 35 U.S.C. §119(e) to U.S. Provisional Application No. 61/675,080 filed on Jul. 24, 2012, which is hereby expressly incorporated by reference into the present application.

BACKGROUND OF THE INVENTION

1. Field of the Invention

The disclosure relates to a system to deliver game audio wirelessly, and in particular to a system to deliver prioritized game audio wirelessly with a minimal latency by processing a low-priority game audio (such as background music) and high-priority game audio (such as sound effects) in a wireless gaming system, thus transmitting high quality positional multichannel audio at a minimal wireless bandwidth.

2. Background of the Invention

A game system using wireless transmission technology to deliver game audio is popular to people. Please referring to FIG. 1, it is the prior art of a system 1 to deliver game audio wirelessly. An interactive game such as Microsoft Xbox or Sony Playstation has two main components: a game console 10 and a game controller 20. Game audio 11 is typically available as a stereo audio signal from the game console 10. The game console typically has also internet access 12 and a video signal output to a TV or display 13.

It is also shown in FIG. 1 how game audio 11 can be delivered to a wireless gaming headphone. First, a wireless audio transmitter 30 with a first antenna 31 is, typically, used to take the game audio 11 from the game console 10, digitize it, compress it (optional), put it into formatted packets, and generate the corresponding radio signal before wirelessly relaying the formatted packets to a wireless gaming headphone 40 with a second antenna 41.

At the wireless gaming headphone, the packets are received by a radio signal receiver, decoded into a digital audio signal, un-compressed (optional) and converted to stereo audio. Since a packet can get lost or be received with erred bits over the air, a re-transmission may be required. Thus, the wireless audio transceiver 30 may contain a radio receiver to receive the acknowledgement packets from the wireless gaming headphone 40. This also implies that the wireless gaming headphone 40 may contain a radio transmitter.

Game audio delivered wirelessly has, therefore, about 40 ms of latency. On an audio/video system running at 60 frames per second, this translates into about a 2.4 frame delay, which can result in an unsatisfactory user experience, especially in games where timing and latency are very important.

This delay can mean the difference between life and death in a game, such as a first-person shooter. A Jun. 26, 2008 article in EDN, "Bluetooth: sufficient fidelity even for average listeners?" stated that the current "target for the industry was about 40 ms", and that "for gaming applications, 10 msec would be the target because gamers' reaction times allow no room for delay. It is one thing to hear audio while viewing videos, but it is another thing to expect to hear audio and instantly react to it." (page 72).

According to the above discussions, audio latency has been one major reason why it is pretty difficult for a wireless gaming headphone to become popular. Therefore, it is needed to provide a system to overcome the disadvantage of the prior art.

BRIEF SUMMARY OF THE INVENTION

It is an objective of the disclosure to provide a system to deliver prioritized game audio wirelessly with a minimal latency. By processing a low-priority game audio (such as background music) and high-priority game audio (such as sound effects) in a wireless gaming system, the system can then be used to transmit high quality positional multichannel audio at a minimal wireless bandwidth.

To achieve the above objective, the disclosure provides a system to deliver prioritized game audio wirelessly with a minimal latency. The system comprises: a game console; a game controller; a wireless audio transmitter; and a wireless gaming headphone. The game console has a game audio signal as a stereo audio signal. The game controller is electrically connected to the game console and used to control the game audio signal. The wireless audio transmitter, with a first antenna, is electrically connected to the game console and used to take the game audio signal from the game console and generate a corresponding radio signal from the game audio signal. And the wireless gaming headphone, with a second antenna, is wirelessly connected to the game console and used to receive wirelessly the corresponding radio signal from the wireless audio transmitter. Wherein, the game audio signal is separated as two components: a background music track (BGM) and a digital command for sound effects (SFX). The background music track is processed as a low-priority game audio and the digital command for sound effects is processed as a high-priority game audio.

According to the feature of the present invention, wherein the wireless gaming headphone further comprises a sound effects database to store a sound effect of the game audio and at least an audio processing algorithm for distance/positioning/volume of the sound effect of the game audio, and the sound effects database is not compressed to send wirelessly, and the audio processing algorithm is digital signal processing (DSP).

According to the feature of the present invention, wherein when the wireless gaming headphone receives the digital command for sound effects from the game console through the wireless transceiver, the audio processing algorithm stored in the wireless gaming headphone can process the received digital command for sound effects and then play back the sound effect of the game audio on the wireless gaming headphone.

According to the feature of the present invention, wherein the digital command for sound effects as a high-priority game audio would be played with a delay from 10 ms to 20 ms, and the background music track processed as a low-priority game audio would be played with a delay around 40 ms.

These and many other advantages and features of the disclosure will be readily apparent to those skilled in the art from the following drawings and detailed descriptions.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION OF THE INVENTION

Although the invention has been explained in relation to several preferred embodiments, the accompanying drawings and the following detailed descriptions are the preferred embodiment of the disclosure. It is to be understood that the following disclosed descriptions will be examples of disclosure, and will not limit the disclosure into the drawings and the special embodiment.

Figure 2:
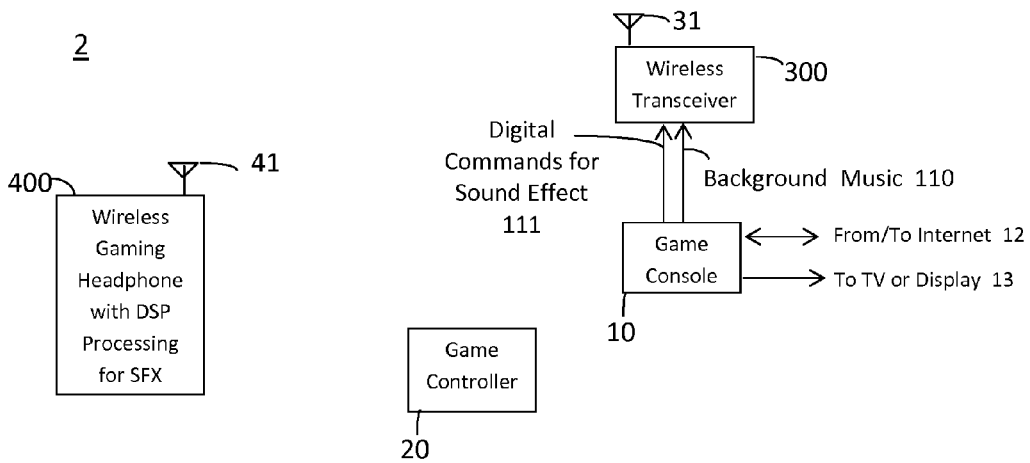
FIG. 2 shows a functional block diagram for the system to deliver prioritized game audio wirelessly with a minimal latency of the disclosure.

To understand the spirit of the disclosure, FIG. 2 shows a functional block diagram for the system 2 to deliver prioritized game audio wirelessly with a minimal latency of the disclosure.

Figure 1:
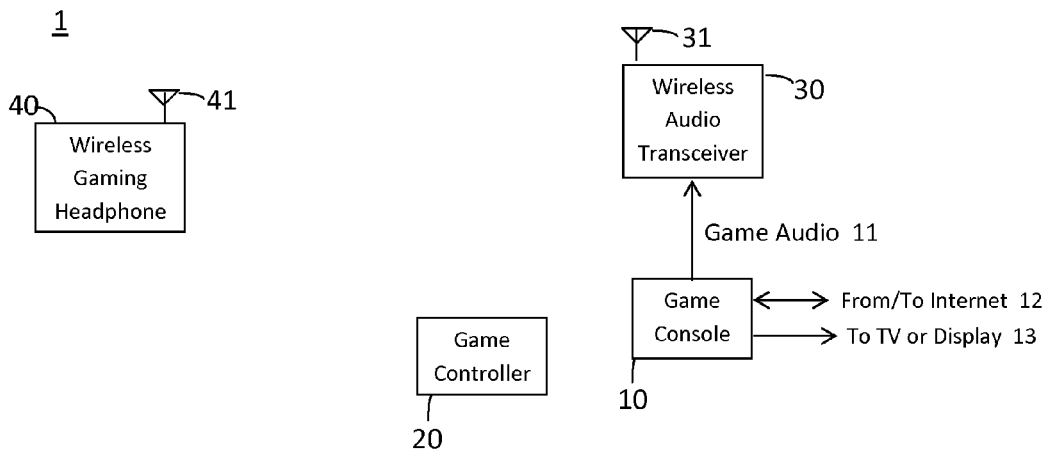
FIG. 1 shows a functional block diagram for the typical system to deliver game audio wirelessly of the prior art.

The system 2 comprises a game console 10; a game controller 20; a wireless audio transmitter 300; and a wireless gaming headphone 400. The game console 10 has a game audio signal as a stereo audio signal. The game controller 20 is electrically connected to the game console 10 and used to control the game audio signal. The wireless audio transmitter 300, with a first antenna 31, is electrically connected to the game console 10 and used to take the game audio signal from the game console 10 and generate a corresponding radio signal from the game audio signal. The wireless gaming headphone 400, with a second antenna, is wirelessly connected to the game console 10, is used to receive wirelessly the corresponding radio signal from the wireless audio transmitter 300. Typically, game audio signal is comprised of two major components: a background music track (BGM) and sound effects (SFX) that tell the player what is happening in the game environment. In this invention, the game audio 11 in FIG. 1 is now split into two different parts, background music 110 and digital commands for sound effect 111. The background music track is of little or no priority, whereas the sound effects are of key importance to a person's success in a competitive game. Therefore, the background music track is processed as a low-priority game audio and the digital command for sound effects is processed as a high-priority game audio.

A wireless system can introduce additional delay while packing/unpacking big audio packets. In addition, the wireless standards, for example, Bluetooth, used in sending such audio, can not only take up much of the usable RF bandwidth, but also introduce various delays due to lost packets and retransmissions. Audio compression-decompression can also add to the delay, as oftentimes there isn't enough bandwidth to send uncompressed audio wirelessly.

The system 2 of the present invention can bypass the drawbacks of the above by having the wireless system send much smaller digital commands, which are then processed in almost-realtime at the wireless gaming headset 400. In this invention, sound effects database are simply stored in the wireless gaming headphone 400, and won't be compressed to send wirelessly. The inherent logic is similar to the separated game audio data transmission over network for many existing online games. To avoid delay introduced by network, the BGM and SFX signals are naturally separated in many multiplayer online RTS (Real-time Strategy) and/or RP (Role-playing) games. Digital commands abstracted from sound effects are already transmitted to and/or generated by the local ends (PCs or game consoles) in those game systems, so they are ready for integration into the proposed art of wireless gaming headphone system.

The system 2 according to the present invention is to separate the processing of these two audio tracks: BGM and SFX. In this invention, background audio/music track that is not time sensitive can continued to be streamed to a wireless gaming headphone 400 in near real-time (40 ms+), compressed or not. Sound effects of the game audio (such as gunshots and footsteps) and the various audio processing algorithms (for distance/positioning/volume) contain small amount of program/data and relatively simple files that should now be stored locally on the wireless gaming headphone in a memory card or on chip. In this invention, the audio processing algorithm is digital signal processing (DSP). If the game wants to play a sound effect, the game console 10 would send a digital command for sound effects through the wireless audio transmitter 300 as a command/control packet to the wireless gaming headphone 400. This digital command for sound effects as a command/control packet is small as it only contains relevant information such as position and time of gun shots, etc. Based on the sound effects database stored at the memory card or on chip of the wireless gaming headphone 400, the DSP program (also stored at the wireless gaming headphone 400) can process the data in the received command/control packet and play back the sound effect of the game audio on the wireless gaming headphone 400. The goal of the system according to the present invention would be to have the same audio processing on the wireless gaming headphone 400 as the game system, so that the sound effects played through each respective system would be indistinguishable from each other. The sound effects and the game background audio would then be mixed/muxed and played back via a speaker of the wireless gaming headphone 400. The most difference between a wireless gaming headphone 400 using this system and one using prior art is that the sound effects would be played with a much smaller delay (say, 10-20 ms faster) on the invention, since the digital command for sound effects as a high-priority game audio would be played with a delay from 10 ms to 20 ms, and the background music track processed as a low-priority game audio would be played with a delay around 40 ms, with the same delay as in the prior art.

The difference between the prior art and our proposed system can better be illustrated using FIG. 2. As is shown in FIG. 2, the game audio 11 is now split into two different parts, background music 110 and digital commands for sound effect 111. A wireless transceiver 300 now is used to send both the digital commands for sound effect and the encoded and packetized BGM. The digital commands for sound effect 111, requiring minimum processing, can be sent with a higher priority to minimize its delay. And the BGM can be sent with a lower priority as its delay is not as critical. The proposed wireless gaming headphone 400, also shown in FIG. 2, has now an additional function: "DSP processing for sound effect", to process the received digital commands for sound effect 111 and generate the SFX audio using the sound effects database stored at the memory card or on chip of the wireless gaming headphone 400. The SFX audio and the BGM received over the air will then be separately amplified and multiplexed before played to the speakers of the wireless gaming headphone 400.

Although FIGS. 1 and 2 show only a wireless gaming headphone 40 and 400, respectively. It is noted in this invention that the wireless gaming headphone 400 which includes at least one microphone can be more popular as it, to support a wireless "live chat" among the game players.

A more complex DSP system would be able to process much of the same positional data with game sound effects to extrapolate multi-channel audio data. A user should be able to distinguish front from rear, along with left and right, leading to a 4 channel or even 5.1 (or higher) channel headphone. A 4-channel headphone, with proper consideration of head-related transfer function, could be implemented by having multiple speakers in the left and right speaker housing. A 5.1 channel implementation could also have a third speaker acting as the center channel, and a fourth speaker reproducing low frequencies for each ear. The low priority game audio (such as background music) would still be played back as a 2-channel (2.0 or 2.1, if a low-frequency speaker is present) audio track.

The advantage of this present invention is clearly observed as follows. A true 5.1 multichannel speaker system takes roughly three times the wireless bandwidth compared to a 2.0 system. However, by sending (1) the background game audio wirelessly as a 2.0 track and (2) the SFX data (containing a true 5.1 multichannel positional data) via the digital commands for sound effect 111 as the digital command/control packets wirelessly for the DSP program to generate the SFX based on the pre-stored data files in the sound effects database at the wireless gaming headphone, we can send all the game audio including the positional information of a 5.1 system with the bandwidth not much greater than that of a 2.0 system.

The system according to the present invention redefines the architecture of the XBox or Playstation and its communication requirements for a wireless Xbox (or Playstation) gaming headset. The advancement of the CMOS nano-meter manufacturing technology, such as 14, 20 or 28 nm, dramatically reduced the power consumption of logic and memory systems, and made it feasible for a wireless gaming headset to include a few Gigabytes of memory and a DSP system to generate the SFX in real-time locally, while minimizing its wireless communication requirements. Such functional partition will better address the need to transmit delay-sensitive SFX audio over the wireless link and should be beneficial to gaming platforms such as the Xbox 360, Playstation 3, and the personal computer.

An Implementation Example

Game audio files needed for generating the SFX audio can be sent and stored to a wireless gaming headset 400 (via either wireless data transfer or a wired cable). Anytime there is a change on such files, a wired or wireless update will be executed. When there are gunshots, each gunshot (or grouping of gunshots if in a burst/continuous fire) triggers the digital commands for sound effect 111 sent from the game console 10 to the wireless gaming headphone 400. Given parameters such as relative position to the player, the gunshot sound effect will be played at a certain volume, at a certain phase and spectral envelopment, given to a certain ear (so the player can ascertain the direction of said gunshots). Processing such as this is currently performed at the gaming system (Xbox, PS3), but would be done on the wireless gaming headphone 400 to greatly reduce latency.

A Second Implementation Example

Pre-storing the DSP programs and relevant data files for SFX processing at the wireless gaming headphone 400 has the following drawbacks: (1) it requires the game platform vendors such as Microsoft and Sony to share its proprietary information with the wireless gaming headphone vendors, (2) the wireless gaming headphone needs a memory big enough to hold the data files and the DSP programs for all the games, (3) the SFX processing delay mostly comes from searching tag and reading data from the embedded/external large-sized flash disk. To address the above issues, anytime when there is no game action (e.g. during the interval between game stages), game-specific stage-related sound effect data files and its corresponding DSP program can be preloaded into buffers or system caches of the wireless gaming headphone directly from the game console via wireless transmission. This method takes advantage of free time slots and high speed caches at the wireless gaming headphone 400 to obtain even shorter latency. It not only encourages game console and game developers to provide support for the wireless gaming headphone/headset system design because of minimal efforts to be required, but also reduces (1) the SFX processing delay, (2) DSP program and data memory requirements at the wireless gaming headphone/headset.

Note also here, the memory or chip of above active circuit can be implemented by using the advancement of the CMOS nano-meter manufacturing technology, such as 14, 20 or 28 nm, wherein the transistor in the memory or chip can be implemented as: Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS). Semiconductor materials broadly applicable to the gain stage and power stage include: silicon, silicon-on-insulator (SOI), silicon-germanium (SiGe), gallium arsenide (GaAs), indium phosphide (InP) and silicon-germanium-carbon (SiGe—C) materials.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A system to deliver prioritized game audio wirelessly with a minimal latency, comprising:
    a game console, having a game audio signal as a stereo audio signal;
    a game controller, electrically connected to the game console, used to control the game audio signal;
    a wireless audio transmitter, with a first antenna, electrically connected to the game console, used to take the game audio signal from the game console and generate a corresponding radio signal from the game audio signal; and
    a wireless gaming headphone, with a second antenna, wirelessly connected to the game console, used to receive wirelessly the corresponding radio signal from the wireless audio transmitter;
    wherein the game audio signal is separated as two components:
        a background music track (BGM) and
        a digital command for sound effects (SFX), the background music track is processed as a low-priority game audio to be played with a delay around 40 ms and the digital command for sound effects is processed as a high-priority game audio to be played with a delay from 10 ms to 20 ms.

2. The system as claimed as claim 1, wherein before generating the corresponding radio signal, the game audio signal is digitized, compressed and put into a packet format.

3. The system as claimed as claim 1, wherein the wireless gaming headphone further comprises a radio transmitter to transmit an acknowledgement packet to the wireless audio transceiver.

4. The system as claimed as claim 1, wherein the wireless audio transceiver further comprises a radio receiver to receive an acknowledgement packet from the wireless gaming headphone.

5. The system as claimed as claim 1, wherein the wireless gaming headphone further comprises a sound effects database to store a sound effect of the game audio and at least an audio processing algorithm for distance/positioning/volume of the sound effect of the game audio, and the sound effects database is not compressed to send wirelessly.

6. The system as claimed as claim 5, wherein the audio processing algorithm is digital signal processing (DSP).

7. The system as claimed as claim 1, wherein the background music track processed as a low-priority game audio is streamed to the wireless gaming headphone in near real-time, around 40 ms, and compressed or not.

8. The system as claimed as claim 5, wherein the sound effects database is stored in a memory card of the wireless gaming headphone.

9. The system as claimed as claim 5, wherein the sound effects database is stored on chip of the wireless gaming headphone.

10. The system as claimed as claim 5, wherein before the game console plays a sound effect, the game console sends the digital command for sound effects in a packet form to the wireless gaming headphone through the wireless transceiver.

11. The system as claimed as claim 5, wherein when the wireless gaming headphone receives the digital command for sound effects from the game console through the wireless transceiver, the audio processing algorithm stored in the wireless gaming headphone can process the received digital command for sound effects and then play back the sound effect of the game audio on the wireless gaming headphone.

12. The system as claimed as claim 2, wherein the wireless transceiver can send both the digital commands for sound effects and the encoded and packetized background music track.

13. The system as claimed as claim 5, wherein the wireless gaming headphone process the received digital commands for sound effects and generate the sound effect of the game audio using the digital signal processing stored in sound effects database at the wireless gaming headphone.

14. The system as claimed as claim 1, wherein the wireless gaming headphone further includes at least one microphone to support a wireless "live chat" among the game players.

15. The system as claimed as claim 14, wherein the generated sound effect of the game audio using the digital signal processing and the background music track are separately amplified and multiplexed before played to a speaker of the wireless gaming headphone.

16. The system as claimed as claim 1, wherein the game audio signal comprising the background music track and the digital command for sound effects is played in a 5.1 channel of the wireless gaming headphone.

17. The system as claimed as claim 1, wherein a memory in the wireless gaming headphone is implemented from one of the CMOS 14, 20 and 28 nm nano-meter manufacturing technologies.

18. The system as claimed as claim 6, wherein the digital signal processing (DSP) is implemented on chip from one of the CMOS 14, 20 and 28 nm nano-meter manufacturing technologies.

\* \* \* \* \*